Jan. 18, 1955
J. W. DORSEY ET AL
2,699,586
HOLD FAST CONSTRUCTION
Filed Aug. 8, 1951
4 Sheets-Sheet 1
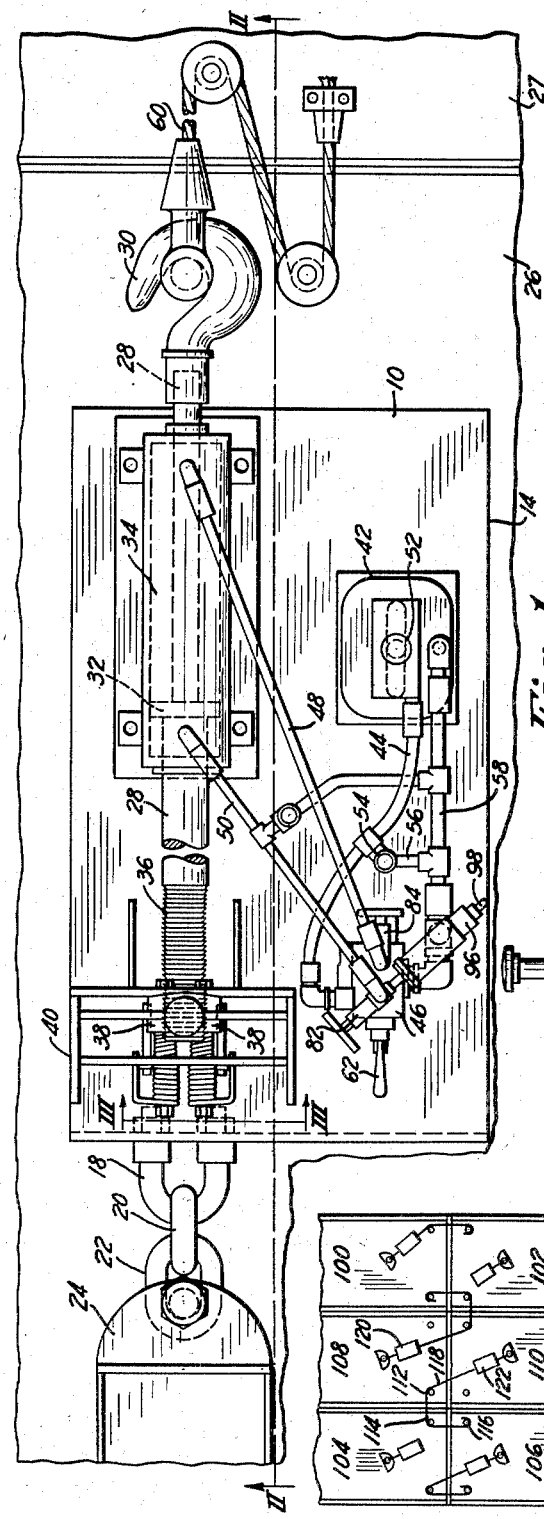
INVENTORS
JOSEPH W. DORSEY,
ARNO J. LIEBMAN,
AND ALFRED S. OSBOURNE
BY
Christy, Parmelee and Strickland.
THEIR ATTORNEYS

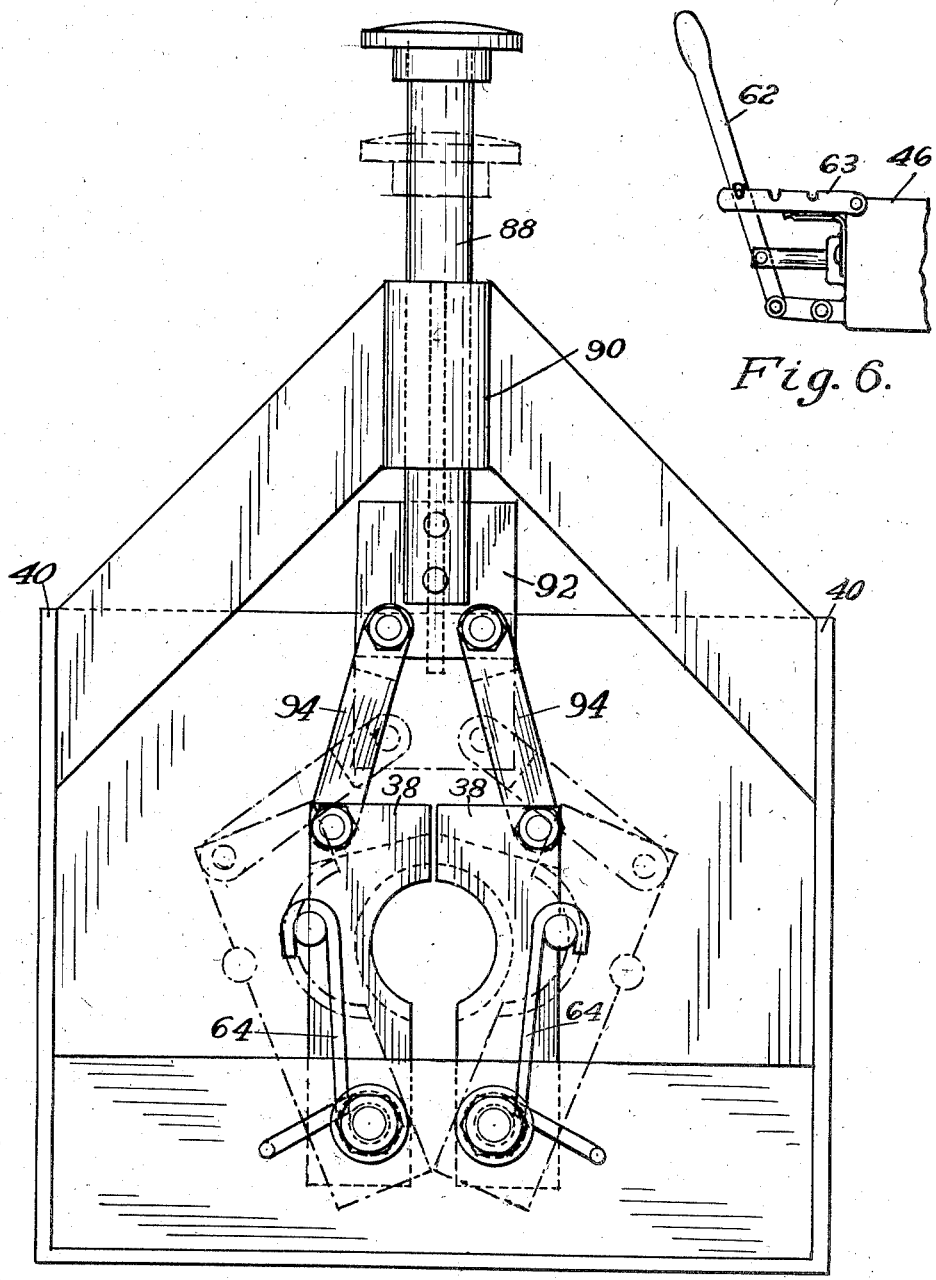

Jan. 18, 1955
J. W. DORSEY ET AL
2,699,586
HOLD FAST CONSTRUCTION
Filed Aug. 8, 1951
4 Sheets-Sheet 4
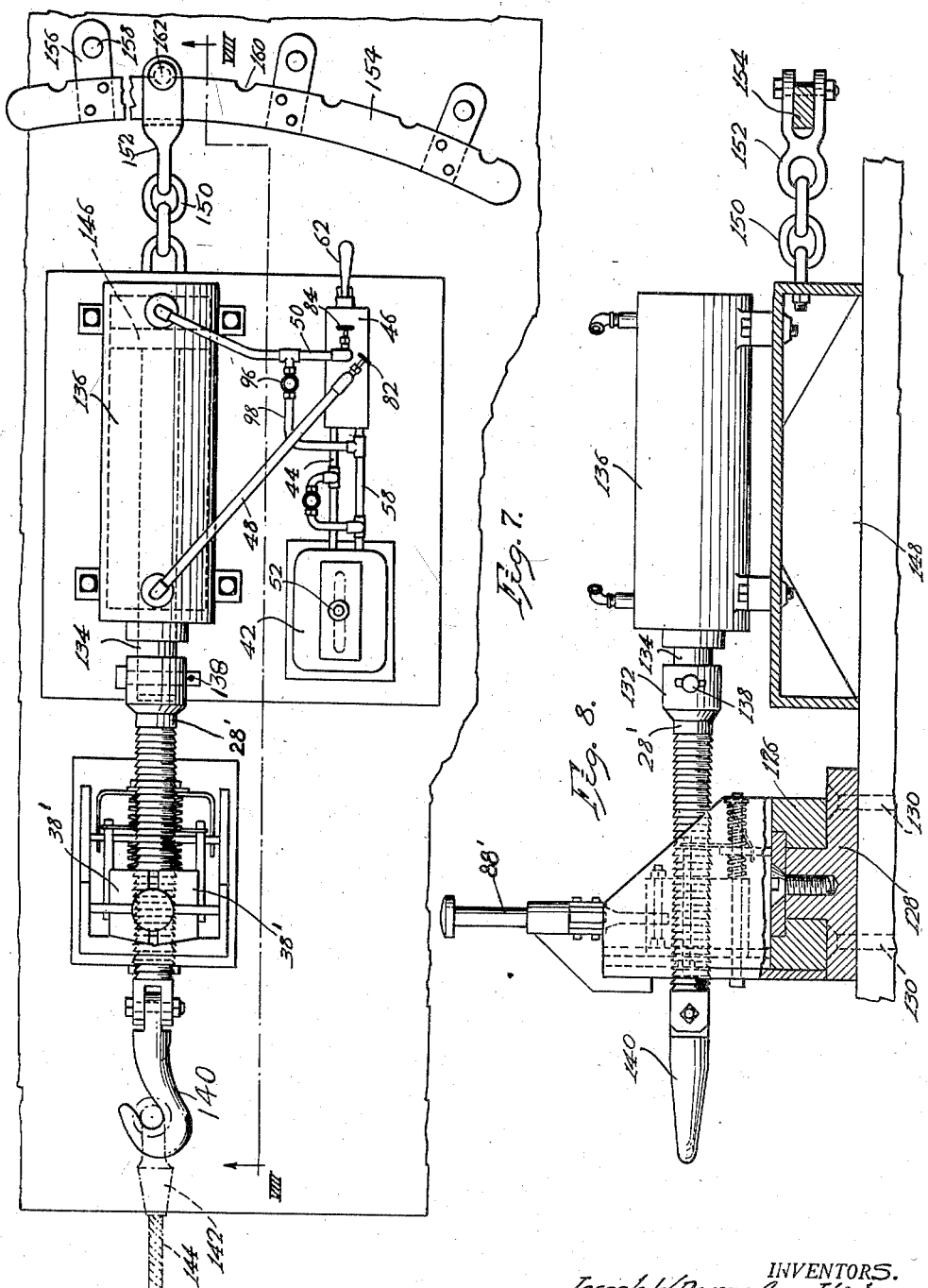
INVENTORS.
Joseph W. Dorsey, Arno J. Liebman
and Alfred S. Osbourne.
BY
Christy, Parmelee and Strickland.
ATTORNEYS.

United States Patent Office 2,699,586
Patented Jan. 18, 1955

2,699,586

HOLD-FAST CONSTRUCTION

Joseph W. Dorsey, Arno J. Liebman, and Alfred S. Osbourne, Pittsburgh, Pa., assignors to Dravo Corporation, Pittsburgh, Pa., a corporation of Pennsylvania Application August 8, 1951, Serial No. 240,971

11 Claims. (Cl. 24—68)

This invention relates to a cable tightening and hold-fast construction to tighten a chain, rope or other cable and hold it under tension. It provides a device which may be used in a variety of situations where it is desired to hold a cable under tension, but it is particularly adapted for use in drawing and holding barges, such as those used on inland waterways, together, by taking up the slack in the cables used to connect the barges and keep the cables under tension. The invention will be particularly described with reference to its use aboard barges, but it is to be understood that it is adaptable to other situations and uses.

In the movement of river barges, a single tow boat may handle from one to twenty barges, each of which is several hundred feet long, and these are lashed together side by side and end to end, depending upon the number of barges, etc. It is important that the cables be tight so that the tow may be effectively handled and properly controlled. At locks which may be frequently encountered, the tow must be broken up and reassembled, so that the operation of pulling the barges together is one that is often repeated many times in a voyage.

An important object of the present invention is to provide a device which may be used for this or other purposes, which can be quickly and easily operated with safety, and can be conveniently and easily handled.

A further object of the present invention is to provide a cable tightening device which is effective to tighten a cable under a certain desired tension and to provide a hold-fast construction to take the strain off the tightening device and continue to hold the cable under tension.

Another object of the invention is to provide a portable cable-tightening device which may be used with one or more hold-fast constructions which hold the cable after being tightened by the cable tightening device.

Before commencing the detailed description, the general principles and construction of the invention will first be described for clarity.

In placing a cable under tension, it is necessary to have a means for first taking up the slack in the cable and tightening it and then to use the tightening means or other means to hold the cable under tension until the cable is to be released. Our invention provides a unit having cooperating tightening means for thus taking up the slack, and holding means for thereafter keeping the cable under tension, the advantages and convenience of which will become apparent during the description.

Generally, our invention provides a fluid operated cylinder and piston. A rod movable within the cylinder is attached to the piston, and on movement of the piston in different directions within the cylinder as controlled by a fluid supply source under pressure, such as a pump and control valves, the rod attached to the piston, and which extends externally of the cylinder, will also move. To place a cable under tension, the cable to be tightened is connected to the rod. Fluid is then forced into the cylinder to move the piston in the cylinder and the rod in a direction to stress the cable. If it is desired to regulate the amount of tension placed on the cable, this may be accomplished by using valves in the pumping supply to determine and limit the pressure on the cylinder within the pump. In this manner, the tension on the cable can be limited to a predetermined maximum. This is desirable, because there is danger with present methods of hitching barges, of overstressing the cable. To reduce the tension on the cable or loosen the cable, it is only necessary to effect movement of the piston in the reverse direction to the extent desired, and thereby reduce the tension either partially or totally.

The cable may be held under tension by closing off the fluid supply to the cylinder and holding the piston stationary after it has been moved to apply tension. However, due to the fact that this imposes a continual strain on the piston and there is always the possibility of the pressure "bleeding off" and thereby loosening the cable, especially if there are alternate strains and stresses on the cable such as might be with connected barges, a hold-fast construction is provided to cooperate with the piston rod to mechanically lock the piston, and thereby avoid the need of keeping pressure in the cylinder. In a preferred embodiment, this hold-fast construction comprises a ratchet-like structure on the rod which engages with a pair of cooperating pawls surrounding the rod to hold it in position. The pawl and ratchet are so designed that the rod may pass through the pawls when moving to stress the cable but are interlocked to normally prevent movement in the opposite direction. Thus, while the cable is being tightened, the rod will move, but when the piston stops, the rod will then be locked against return movement, and the strain on the piston can thus be transferred to the hold-fast pawls and the cable held under tension by them. To release the cable from the hold-fast construction, manual means are provided to disengage the pawls from the rod, which is then free to move in the direction toward the cable to reduce the tension.

Our invention, and the objects and advantages thereof, will be more fully apparent by reference to the accompanying drawings, wherein a present preferred embodiment of our invention is shown. In the drawings:

Fig. 1 is a plan view of the barge tightening device shown as mounted on the top and near the end of a barge;

Fig. 2 is a view in side elevation with parts shown in section of the barge tightening device shown in Fig. 1, the hydraulic fluid pump being omitted;

Fig. 3 is a front elevation of the mechanism for locking the tightening device under a desired stress;

Fig. 5 is a diagrammatic plan view illustrating the use of the tightening device for tying a group of barges together;

Fig. 6 is a detail view showing the hand lever for adjusting the four-way hydraulic valve;

Fig. 7 is a plan view of a modified form of cable tightening device wherein the hydraulic cylinder and pump are mounted on a portable unit and the hold-fast ratchet and pawl blocks are mounted on a separate unit which is permanently attached to the deck of a barge; and Fig. 8 is a side elevation of the cable tightening device shown in Fig. 7.

Figure 4:
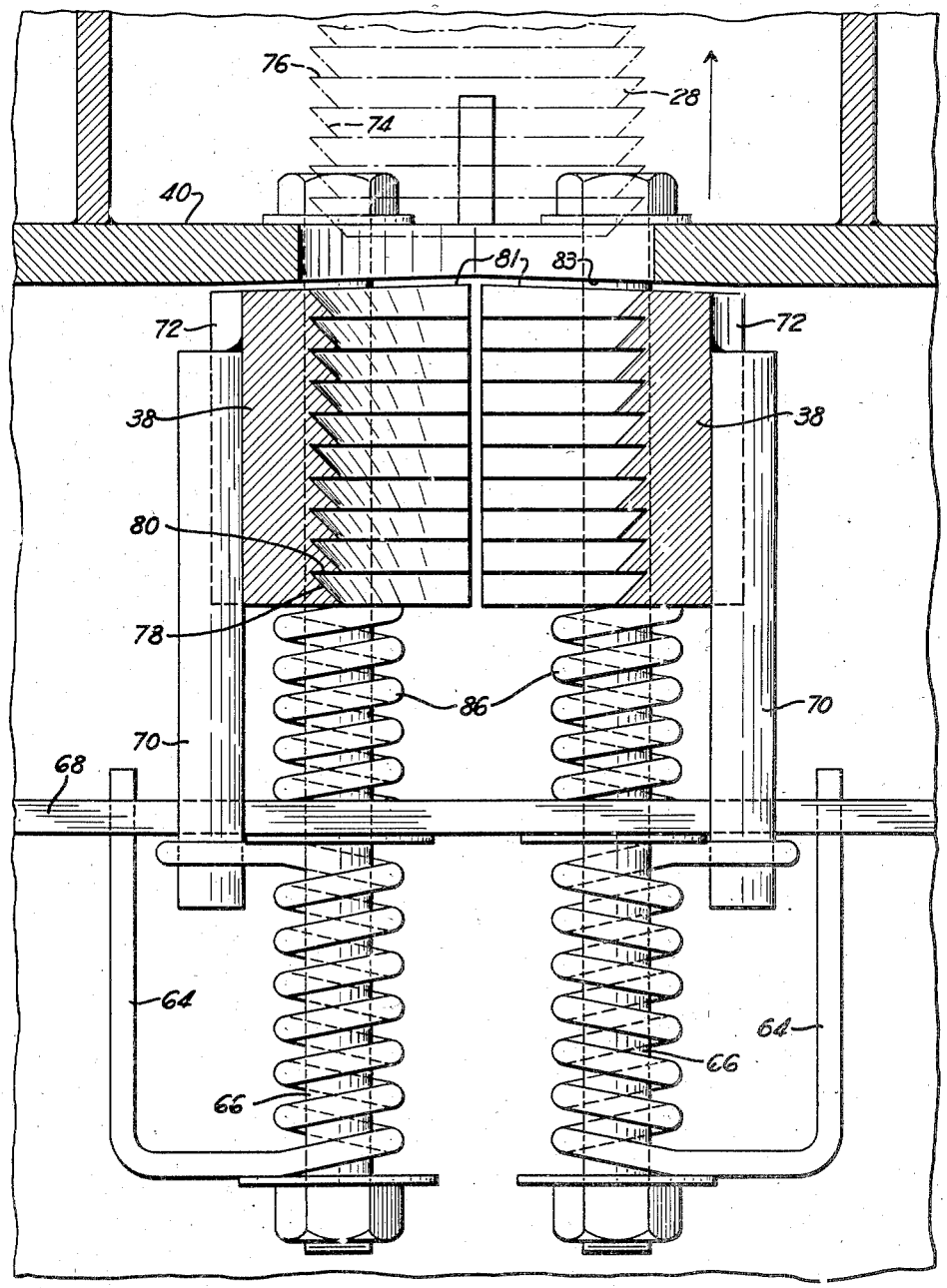
Fig. 4 is a detail plan view with parts in section of the locking mechanism shown in Fig. 3.

Referring to Figs. 1 and 2, the cable tightening and locking device is illustrated as mounted on a supporting plate or platform 10 having downwardly-turned end and side walls 12 and 14 respectively, the plate itself being designated 16. This arrangement elevates the platform to a convenient height above the deck of the barge or other surface on which it is used. A U-bolt or clevis 18 is secured to one end of the platform 10, and this U-bolt 18 may be connected by means of links 20 and 22 to an anchor frame 24 secured, for example, to the barge deck 26 (Fig. 2). The tightening device consists broadly of a rod 28 having a cable hook 30 at its front end, the rod extending through a hydraulic cylinder 34, and having a piston 32 fixed thereon within the cylinder. The rod 28 extends through and beyond the cylinder at the opposite end and has a series of ratchet teeth 36 formed on the rear end thereof, these teeth extending around the rod. This portion of the rod extends between a pair of pawl blocks 38 that are pivotally mounted to a rigid frame 40 fixed to the top of the platform. Because of the teeth extending around the rod, the rod may rotate on its axis while the teeth will remain in position to be engaged by the pawl blocks.

The piston 32 in the cylinder is operated by pressure fluid supplied by a pump 42, preferably a small hand pump, mounted on the platform at the side of the cylinder. Pressure fluid supplied by the pump flows from the pump through a feed line 44 to a four-way valve 46, and is then distributed through lines 48 or 50, depending upon which way the piston is to be moved. The pump, which is comparable to that used in hydraulic jacks and the like, has a handle 52 which projects upwardly therefrom, said pump being arranged to supply a pumping fluid such as oil, or a mixture of oil with alcohol or glycerine, to the cylinders at a comparatively high pressure from 1,000 to 2,000 pounds per square inch. The oil passing through the feeding line 44 flows through a pressure-regulating valve 54 which maintains a predetermined maximum pressure on the fluid being pumped. If the pressure in the feed line tends to rise above the predetermined maximum, the valve will open and bypass fluid from the feed line through a line 56 to a return line 58 that returns fluid to the sump of the pump. Normally the pressure fluid is supplied through the line 48 to operate the piston 32 to place tension on a cable 60 connected with the hook 30. The four-way valve 46 has an operating lever 62 (Fig. 6) which, when in the position shown in Fig. 1, is arranged to direct the pressure fluid through the line 48. When fluid passes through the line 48, fluid behind the piston 32 returns through the line 50 to the valve, and then through the return line 58 to the sump of the pump. If it is desired to move the rod 28 in a position to release the pressure on the cable 60, the lever 62 will be shifted to engage the notch at the right of a detent 63, as shown in Fig. 6, and pressure fluid at that time will flow through the line 50 to the back side of the piston 32, and fluid on the opposite side of the piston will be moved out through the line 48 to the four-way valve, and then be returned through the line 58 to the pump sump.

When the rod 28 is moved by the pressure fluid to place a pressure on the tightening cable 60, the ratchet teeth on the rod move between the pawl blocks 38 (Fig. 3) which are yieldingly held in engagement with the rod by means of torsion springs 64. The springs 64 (Fig. 4) are mounted upon pivot bolts 66 secured in the frame 40, the pawls 38 being pivoted on the bolts for movement in a plane at right angles to the rod 28. One end of the springs 64 is held by an abutment bar 68 attached to the cover of the platform 10, and the other ends of the springs are connected with rods 70 which are secured by welding in cavities 72 on the sides of the pawl blocks 38. The ratchet teeth or rings on the rod 28 have an inclined face 74 and a locking face 76 on each tooth (Fig. 4). As the rod is moved to tighten the cable, the inclined or cam faces 74 of the ratchet teeth or rings move over inclined faces 78 of the pawl blocks to open the pawl blocks, and when the edges of the teeth of the ratchet pass the edge of the teeth on the pawl blocks, the torsion springs force locking faces 80 on the pawl blocks against the locking faces on the ratchet teeth.

The end faces 81 of the pawl block 38 are slightly angled to form a convex truncated conical surface, and the confronting face 83 of the fixed abutment 40 is correspondingly recessed to form a concaved truncated conical surface, as best shown in Fig. 4. When tension in the direction of the arrow in Fig. 4 is applied to the rod, and the pawl faces 80 are interlocked with the ratchet teeth, these conical surfaces 81 and 83 are drawn into tight interfitting contact, as a result of which the pawls 38 may not be withdrawn from the ratchet teeth faces 76, either deliberately or accidentally, until tension is again relieved and the sloped surfaces separate from the position shown in Fig. 4. The pawl blocks, by reason of the manner above described of mounting them, have a limited fore and aft movement adequate to effect this result. With this arrangement, once the cable has been tightened, it will be held even though there is no pressure in the cylinder, and to release the pawls, the cylinder must be operated to release the tension on the ratchet teeth 76.

As an added protection for keeping the cables locked under tension, a valve 82 in line 50, and a valve 84 in line 48 (Fig. 1) are closed to prevent liquid from entering or leaving the cylinder 34, and thus the cylinder and piston will act to hold the rod 28 under tension if the pawl should be disengaged from the ratchet. It is understood that when the barges are tied together preparatory for transportation, they are locked together and therefore the valves 82 and 84 will be closed to assist in holding the cables in locked position under tension. During the tightening operation the cable valves 82 and 84 are opened.

When it is desired to disconnect the barges, or to release the tension on the rod 28, the four-way valve handle 62 is moved into the extreme right position of Fig. 6, whereby pressure fluid will be introduced into the back of the cylinder behind piston 32. This pressure fluid will tend to relieve the pressure of the ratchet 36 in the pawl blocks so that the blocks can be moved into a position to release the rod 28 and allow the pressure fluid to move the piston 32 to the right, viewing Fig. 1, to permit the cable to be disconnected from the hook. While the rod 28 is under high tension, the locking grip of the pawls is very tight, so that, as heretofore explained, the pawls must be released from the ratchet before the pawls may be manually opened or moved outwardly as indicated in dotted lines in Fig. 3 to release the rod for movement to the right (Fig. 1) in releasing the tension on the cable. To release the pawls from the ratchet, compression springs 86 are mounted upon the bolts 66 (Fig. 4) between the abutment bar 68 and the back sides of the pawls. Springs 86 normally hold the pawl blocks 38 against the frame 40, and when the holding pressure on the rod is released and the rod is moved to the left, viewing Fig. 1, or downwardly as viewed in Fig. 4, the springs will be compressed. This movement acts on the inclined faces 78 of the teeth of the pawl blocks to initially release the blocks. When the ratchet pawls are released, they may be moved outwardly manually by a hand-operated plunger 88 which is mounted in a guide 90 secured to the frame 40 (see Fig. 3). A spreader 92 is secured to the lower end of the plunger 88, and toggle links 94 are pivotally connected between the spreader 92 and the upper ends of the blocks 38, so that downward movement of the plunger thrusts the pawl blocks apart by motion transmitted through the toggle links. When the pressure on the locking pawls is released, the blocks may readily be moved to the position shown in dot-and-dash lines in Fig. 3 by pressing on the plunger 88.

When used in the manner described on barges, the cable tightening devices of the type illustrated in the drawings are normally positioned on the top deck of the barges where they are exposed to the weather. In the summer time the sun has an opportunity to heat the cylinder 34 and the hydraulic liquid therein, so that the pressure may tend to increase and place an extra strain on the cables. To provide for this contingency, a relief valve 96 is connected with the line 50 which is set to operate at a predetermined pressure, and if the expansion of the fluid exceeds the predetermined pressure, then the relief valve will allow fluid to flow from the line 50 through a line 98 to the line 58, to the pump 42. This construction will maintain a predetermined tension on the cables.

For illustration of one way of using our invention, Fig. 5 illustrates portions of a group of six barges arranged in fore and aft and side-by-side relation. In this arrangement it will be seen that barges 100, 102, 104, and 106 will be drawn together end-to-end by the tightening devices on the ends of barges 100 and 106. The tightening devices on the central barges 108 and 110 are used for pulling the ends of the barges 108 and 110 closer together, and at the same time to draw the outside barges into close engagement with the inside barges. To accomplish this, the cable from a tightening device 122 on barge 110 will pass over a head 112 on barge 108 to a head 114 on barge 104, and thence to a head 116 on barge 106. When the cable 118 is tightened, it will tend to draw the end of the bargge 106 against the end of the barge 104, and at the same time the barges 104 and 106 will be drawn against the sides of barges 108 and 110. A tightening device 120 on the barge 108 can be connected in the same way as the tightening device 122 on the barge 110 as just described, to draw the right-hand side of the ends of the barges, viewing Fig. 5, close together, and at the same time draw the barges 100 and 102 against the sides of the barges 108 and 110.

Referring to Figs. 7 and 8, a modified form of the cable tightening device is shown, in which the hydraulic cylinder, pump, and four-way valve are mounted on a separate platform from the hold-fast unit, and which may be attached to or disconnected from the hold-fast unit. Thus in the handling of barges a single hydraulic pump and cylinder unit may be used with a plurality of hold-fast units, one on each of several barges. In this arrangement, as illustrated in these figures, the pawl and ratchet hold-fast mechanism is preferably mounted on a block 126 which is rotatably mounted on a swivel 128 which is secured to the deck of a barge by means of bolts 130. The ratchet rod 28' is provided with a coupling 132 which may be detachably connected with the end of a piston rod 134 mounted in a hydraulic cylinder 136. The rods 28' and 134 are connected by means of a transverse bolt or pin 138. On the opposite end of the rod 28' is pivotally connected a hook 140 which is adapted to receive a loop 142 attached to a cable 144 which is to be tightened. The hold-fast mechanism through which the ratchet rod operates has the same construction and mode of operation as that described with reference to Figs. 1, 2, 3 and 4, and repetition of the description is unnecessary, except that the pawl blocks are designated 38' and the release plunger 88'.

The hydraulic cylinder 136 is different from the cylinder 34 in that the piston rod 134 does not pass entirely through the cylinder, but is connected with a piston 146 which operates in the cylinder. In conjunction with the hydraulic cylinder 136, a hydraulic pump 42 and a four-way valve 46 are used, which have the same construction as that described above with reference to Figs. 1 and 2. The pump and valve mechanism are mounted on a platform 148 which is provided with a chain 150 and clevis 152 for connection with an anchor bar 154 that is permanently attached to the deck of a barge by means of brackets 156 and bolts 158. A series of notches 160 is formed in the anchor bar around the periphery thereof to receive a pin 162 in the clevis by which the pumping unit may be connected in any of the various notches on the anchor bar. The anchor bar has an arcuate construction which is formed by an arc having its center at the pivot of the plate 126, so that the hydraulic cylinder and hold-fast unit may be rotated to place a straight line pull on the cable 144 for tightening it. When a cable is tightened by operation of the hydraulic cylinder, the hold-fast pawl blocks will lock the cable in tightened position, and thereafter the hydraulic cylinder may be operated to relieve the tension on the ratchet rod 28' to permit the pumping unit to be disconnected from the ratchet rod. At the same time the clevis 152 may be disconnected from the anchor bar 154 to separate the pumping unit from the hold-fast unit to permit the pumping unit to be transported to another position for tightening a cable. It will be understood that in connection with the cable tightening of barges, the hold-fast unit and the anchor bar would be permanently attached to each barge. The portable hydraulic pumping unit, which is relatively light and easily handled, may then be moved from barge to barge and connected between the anchor bar and the hold-fast unit for the purpose of tightening or releasing the cables.

With the construction outlined above, it will be seen that the tightening devices are so constructed and arranged that by an easy operation of a hydraulic pump, a predetermined pressure can be placed on the tightening cables, and the cables locked in tight holding position. This tightening pressure will normally be a pressure which will place a desired tension on the cables, which is well within the factor of safety, and may be substantially uniform for all cables. The locking device will positively hold the cables under the desired tension, and when the valves 82 and 84 are closed, the hydraulic liquid will tend to lock the cables under the desired tension.

Although the invention has been illustrated and described with reference to tightening cables for holding barges together, it will be understood that the cable tightener and hold-fast may be used for many purposes, and may be used in substantially any place where cables are to be tightened, especially where the cable is to be held under tension for a period of time after it has initially been drawn taut. The cable tightener may be used for positioning work and holding the work in a desired position.

The hold-fast construction may be used with a fluid-operated piston, which may be operated as a jack for pushing, pulling or lifting, to hold a piston rod or a member moved by the piston rod in the position in which it has been placed by the piston. Such fluid-operated jacks are extensively used to position heavy fabrication parts and hold them in position while they are being fabricated, assembled and connected together. Since the hold-fast device of the present invention has a rod with a plurality of annular teeth, and the pawl blocks have interfitting teeth that engage around the periphery of these teeth, the strain on the teeth is not concentrated, and very great loads can be handled without danger of the teeth stripping or breaking.

In place of a liquid or hydraulic pump for operating the cylinder piston, air or gas under pressure or a pneumatic pump may be used for operating the cylinder piston to effect movement of the piston rod.

The preferred form of the invention having thus been described, what is claimed as new is:

1. A cable tensioning device of the class described comprising a supporting structure having pawl blocks movably mounted thereon, said pawl blocks having ratchet teeth therein, a rod movable between the pawl blocks and ratchet teeth thereon to be engaged with the teeth of the pawl blocks, means for effecting lateral movement of the pawl blocks out of engagement with the ratchet teeth on said rod, springs normally acting to move the pawl blocks into engagement with the teeth on the rod, locking means on the support positioned to be engaged by locking means on the pawl blocks, means to urge the pawl blocks to bring the said locking means into engagement with one another when the rod is under tension, and a fluid pressure cylinder and piston unit connected with the rod for effecting positive longitudinal movement thereof in either direction.

2. A cable hold-fast device of the class described comprising a rod having a succession of ratchet teeth thereon, and having a connector for a cable to place the cable under tension, a base having a support thereon, a pair of pawl blocks having ratchet teeth therein mounted on the support between which the toothed area of the rod extends, said blocks being pivotally supported for movement transversely of the rod on pivots eccentric to the axis of the rod, means to move said blocks while engaged with the rod into contact with the support, means for moving the blocks transversely of the rod into and out of engagement with the teeth, and cooperating locking means on the blocks and support which are brought into engagement by longitudinal movement of the blocks into engagement with the support for locking the blocks against release from the teeth.

3. A cable hold-fast device of the class described comprising a rod having a succession of ratchet teeth thereon and provided with a device for connection with a cable, a base having a support thereon, a pair of pawl blocks having ratchet teeth therein mounted on the support between which the toothed area of the rod extends, said blocks being pivotally supported for movement transversely of the rod on pivots eccentric to the axis of the rod, said blocks also being movable longitudinally on the support to a limited extent, separate means for moving the blocks transversely of the rod into and out of engagement with the teeth, cooperating means on the blocks and support which are brought into engagement by longitudinal movement of the blocks when the rod is operated to place the cable under tension and to lock the blocks against release from the teeth, and springs normally urging the blocks in a longitudinal direction into said locking engagement with the support.

4. A cable tightening and hold-fast construction comprising a cylinder, a fluid operating piston therein, a rod connected to said piston and having a connection externally of said cylinder with a cable to be tightened and held under tension, a pump for supplying fluid under pressure having connections with said cylinder to operate said piston and rod to apply the desired tension to the cable, a pressure regulating valve in the fluid supply connections to limit the pressure applied to the piston, a supporting frame arrangement to hold said cylinder in a fixed position while the cable is placed under a predetermined limited tension by said piston and rod, and a hold-fast for taking the strain off of said piston and hold the cable after it has been tightened comprising ratchet teeth on said rod, a locking pawl having teeth mounted to engage said ratchet teeth, said pawl being movably mounted on said supporting frame, and means to move said pawl into engagement with said supporting frame to lock the pawl in the ratchet teeth while the cable is tightened and to release the strain from said piston and hold the cable under tension.

5. A cable tensioning and hold-fast device comprising a supporting structure having pawl blocks movably mounted in front thereof, a concave conical face on the supporting structure in position to be engaged by the pawl blocks, said blocks having ratchet teeth therein and having a convex conical face on the front thereof to engage the conical face on the supporting structure, a rod movable between the pawl blocks having ratchet teeth thereon for engagement with the teeth of the pawl blocks, means for moving the pawl blocks out of engagement with the ratchet teeth on the rod, springs normally acting to move the pawl blocks into engagement with the teeth on the rod, means to move the pawl blocks longitudinally with the rod to locking position against the conical face of the supporting structure when the rod is under tension, and a fluid pressure cylinder and piston connected with the rod for affecting positive longitudinal movement of the rod in either direction.

6. A cable tensioning and hold-fast device of the class described comprising a rod having a succession of ratchet teeth thereon, a base having a support thereon, a pair of pawl blocks having ratchet teeth therein mounted on the support between which the toothed area of the rod extends, said blocks being pivotally supported for movement transversely of the rod on pivots eccentric to the axis of the rod, said blocks also being movable longitudinally on the support to a limited extent, means for moving the blocks transversely of the rod into and out of engagement with the teeth, cooperating means on the blocks and support which are brought into engagement by longitudinal movement of the blocks in one direction relatively to the support for locking the blocks against release from the rod, springs normally urging the blocks in a longitudinal direction toward such locked position, and a fluid pressure cylinder mechanism and piston for positively moving said rod in either direction, said mechanism including a pump and a selectively operable valve between the pump and cylinder for controllably operating the piston in either direction.

7. A cable tensioning and hold-fast device of the class described comprising a rod having a succession of ratchet teeth thereon, a base having a support thereon, a pair of pawl blocks having ratchet teeth therein mounted on the support between which the toothed area of the rod extends, said blocks being pivotally supported for movement transversely of the rod on pivots eccentric to the axis of the rod, said blocks also being movable longitudinally on the support to a limited extent, means for moving the blocks transversely of the rod into and out of engagement with the teeth, cooperating means on the blocks and support which are brought into engagement by longitudinal movement of the blocks in one direction relatively to the support for locking the blocks against release from the rod, and springs normally urging the blocks in a longitudinal direction toward such locked position, said rod having a cable engaging terminal at one end and a coupling at the other end for attachment to an operating cylinder and piston.

8. A cable tensioning and hold-fast device comprising a supporting base, means for movably anchoring said base on a deck or other structure for movement over the deck or other structure in a direction to align itself with the direction of pull, a cylinder on the base, a rod connected with a piston operating in said cylinder, said rod having a cable engaging terminal at one end, means for selectively applying fluid pressure to either end of the cylinder, a pawl mechanism surrounding the rod and secured on the supporting base, ratchet teeth on the rod cooperating with ratchet teeth of the pawl mechanism, and means for moving the pawl mechanism into and out of engagement with the ratchet teeth.

9. A cable tensioning and hold-fast means as defined in claim 8 wherein the supporting base is in two parts, one part having the cylinder thereon and the other part having the pawl mechanism thereon, and wherein the rod has a releasable coupling between the cylinder and the ratchet teeth whereby the cylinder and piston may be selectively attached and detached from the rod and pawl mechanism.

10. The hold-fast construction defined in claim 4 in which the locking pawl is divided, with each part constructed to surround substantially one-half of the rod, and springs normally acting to force the pawl parts into engagement with the rod ratchet.

11. The hold-fast construction defined in claim 10 in which one end of each of the pawl parts is mounted on a fixed pivot and the other end of each pawl part is connected with one end of a toggle link, and a pusher is connected with both of the toggle links by which the pawl parts may be moved to releasing position against the action of the springs when the pawls are released from the ratchet.

References Cited in the file of this patent

UNITED STATES PATENTS

| | | |
|---|---|---|
| 411,681 | Ridgway | Sept. 24, 1889 |
| 986,392 | John | Mar. 7, 1911 |
| 1,073,954 | Burns | Sept. 23, 1913 |
| 1,156,261 | White | Oct. 12, 1915 |
| 2,223,576 | Rasch | Dec. 3, 1940 |

FOREIGN PATENTS

| | | |
|---|---|---|
| 107,624 | Austria | Oct. 25, 1927 |